United States Patent [19]
Tobin

[11] 3,778,090
[45] Dec. 11, 1973

[54] BEADED TUBE WITH O-RING SEAL CONNECTION

[75] Inventor: Michael F. Tobin, Saginaw, Mich.

[73] Assignee: General Motors Corporation, Detroit, Mich.

[22] Filed: May 18, 1972

[21] Appl. No.: 254,561

[52] U.S. Cl................. 285/222, 29/157.4, 29/523, 285/382.5
[51] Int. Cl............................................ F16l 41/00
[58] Field of Search............. 285/222, 382.5, 382.4, 285/382, 382.1, 382.2; 29/523, 157.4

[56] References Cited
UNITED STATES PATENTS

| | | | |
|---|---|---|---|
| 3,326,006 | 6/1967 | Mount.......................... | 285/382.5 X |
| 2,551,871 | 5/1951 | Briggs........................... | 285/382.5 X |
| 2,268,142 | 12/1941 | Lusher et al................. | 285/382.5 X |
| 2,179,248 | 11/1939 | Bandish et al.............. | 285/382.5 X |
| 2,165,621 | 7/1939 | Donahue et al............. | 285/222 X |
| 3,589,752 | 6/1971 | Spencer...................... | 285/382.4 X |
| 779,896 | 1/1905 | Wood........................... | 285/382.5 X |
| 2,450,581 | 10/1948 | Couty.......................... | 285/382.5 X |
| 2,779,279 | 1/1957 | Maiwurm..................... | 29/523 X |

FOREIGN PATENTS OR APPLICATIONS

| | | | |
|---|---|---|---|
| 455,785 | 3/1950 | Italy.............................. | 285/382.4 |
| 1,801,294 | 5/1970 | Germany..................... | 285/382 |
| 683,803 | 7/1966 | Belgium...................... | 285/382.4 |

*Primary Examiner*—Thomas F. Callaghan
*Attorney*—J. L. Carpenter et al.

[57] ABSTRACT

A beaded tube with O-ring seal connection wherein a relative thin walled tube extending through a counterbored aperture in a tube block is upset to provide annular beads on opposite sides of the tube block to lock the tube to the tube block, an O-ring being positioned to encircle the tube in sealing engagement with a bead surface of the tube and with the walls of the counterbore in the tube block.

5 Claims, 6 Drawing Figures

PATENTED DEC 11 1973 3,778,090

BEADED TUBE WITH O-RING SEAL CONNECTION

This invention relates to a tube connection and, in particular, to a thin walled beaded tube connection for securing the tube to a manifold block with an O-ring seal thereon.

It is a well-known practice to secure a tube to a tube block either by welding or brazing the tube directly to the tube block or by the use of a threaded coupling arrangement having a packing associated therewith to connect the tube to tube block to provide a fluid tight connection therebetween.

It is therefore the principal object of this invention to provide a connection for a tube to an apertured tube block in which the tube is mechanically fixed against axial and rotative movement relative to the tube block in sealed relation relative to the tube block.

Another object of this invention is to provide a tube connection by means of which a leak-proof rigid connection is effected between a thin walled tube and a tube block.

These and other objects of the invention are attained by providing a counterbored aperture in a tube block, inserting a thin walled tube through the counterbored opening with an O-ring gasket encircling the tube within the large portion of the counterbored aperture and then upsetting the tube on opposite sides of the tube block to provide a bead in engagement with one of the side walls of the tube block and a second bead extending into the enlarged portion of the counterbore to lock the tube against axial displacement within the tube block and at the same time to force the O-ring gasket into sealing engagement against the outer periphery of the tube and the wall of the counterbore in the tube block.

For a better understanding of the invention, as well as other objects and further features thereof, reference is had to the following detailed description of the invention to be read in connection with the accompanying drawings, wherein.

Figure 1:
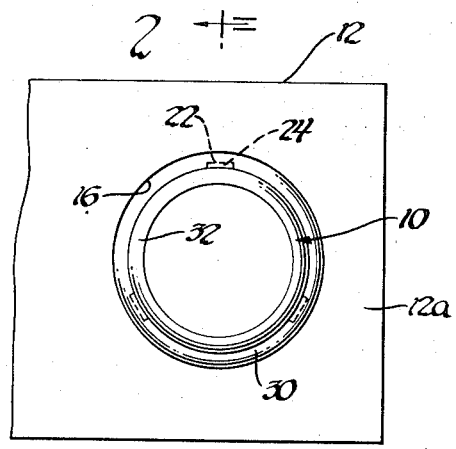
FIG. 1 is an end view of the tube to tube block connection of the subject invention.
Figure 2:
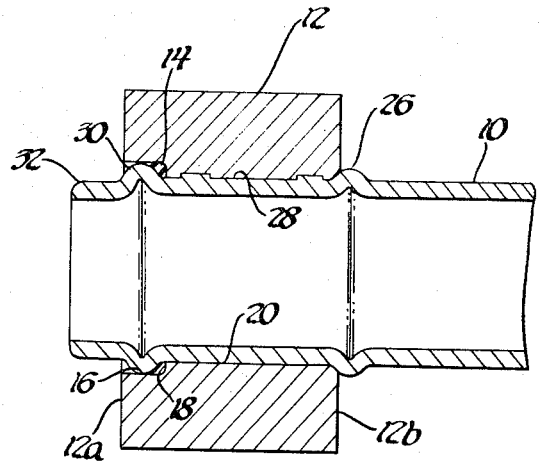
FIG. 2 is a sectional view taken along line 2—2 of FIG. 1.

Referring now to FIGS. 1 and 2, the tube 10, of relatively thin walled construction of suitable ductile material, such as aluminum, is secured to a tube block 12 which is also of suitable material such as aluminum and which may be a separate element, as shown, or it may be part of a manifold assembly having a plurality of tubes secured thereto. The tube 10 is secured to the tube block 12, in a manner to be described, so that it is fixed against axial movement and rotative movement relative to the tube block 12 with a sealing ring or gasket 14 positioned to provide a seal between the tube 10 and tube block 12.

As shown, tube block 12 is provided with a through counterbore consisting of opposed first and second bores of different sizes extending from opposite front and rear surface portions or walls 12a and 12b, respectively, of the tube block and meeting coaxially with a shoulder therebetween. The first bore forms a cylindrical wall portion 16 of a diameter substantially greater than the nominal outside diameter of tube 10 and this bore extends from wall 12a to terminate at a radial inward extending wall 18 which may be at any suitable angle to the axis of the counterbore and is illustrated as being at right angle thereto in the embodiment disclosed, and the second bore forms a cylindrical wall portion 20 of reduced diameter extending from wall 12b. The diameter of cylindrical wall portion 20 is preferably slightly larger than the nominal outside diameter of tube 10 to slidably receive the tube 10 therein during assembly for a purpose to be described.

The cylindrical wall portion 20 is also preferably provided with circumferentially spaced axial slots or notches 22 to receive the radial outward extending tube anti-rotation locks 24 on the exterior of tube 10 within the tube block 12 whereby the tube is held against rotation relative to the tube block. In the embodiment illustrated, the slots or notches 22 are in the form of rectangular indentations or splines, with two rows of three locks per row. Ball dimples, long slots and other bore depressions, not shown, could also be used to lock the tube rotationally in the tube block, as desired.

The tube 10, of a suitable nominal outside diameter, as desired, is provided, after assembly to the tube block 12, with an external annular bead or upset portion 26 thereon abutting against the surface 12b on one side of the block 12, an enlarged diameter portion 28 in abutment against the cylindrical wall portion 20 of the tube block, this portion having the external anti-rotational locks 24 thereon, a second external annular bead or upset portion 30, the outer periphery of which is in engagement with the cylindrical wall 16 and a cylindrical free end portion 32, of the desired diameter, extending away from the surface 12a of the tube block.

The sealing ring or gasket 14 which is disposed on the outer surface of the enlarged diameter portion 28 of tube 10 is preferably an O-ring seal but it may be a ring seal of any suitable cross section which is constructed of compressible material and is suitably dimensioned for the purpose. In addition, the O-ring seal 14, as used in the embodiment of the connection illustrated, is a "crush" or "jam" type seal since in the assembly of the tube 10 in the tube block 12 this seal is jammed into sealing engagement against one side surface of the bead 30 and against the wall portions 16 and 18 of the tube block.

Figure 3:
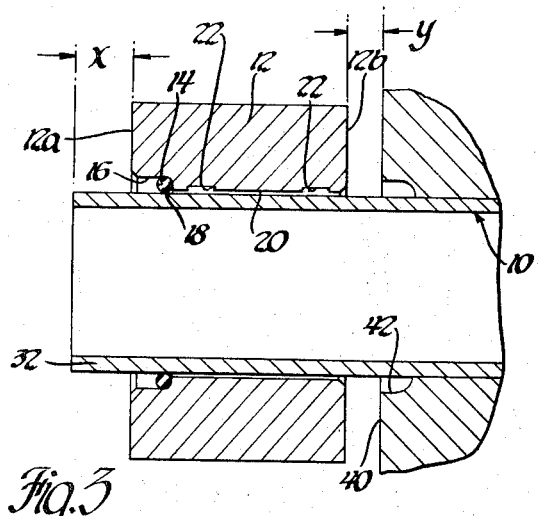
FIGS. 3, 4, 5 and 6 are views of the four sequential steps required to fabricate the tube connection of the invention.

Reference is now made to FIGS. 3, 4, 5 and 6 which illustrate the processing steps required to assemble the tube 10 to the tube block 12 in accordance with the invention, these processing steps being as follows:

With reference to FIG. 3, the tube 10 is inserted into the bore of the tube block 12 and the O-ring seal 14 is positioned over the free end of the tube and moved thereon to a position in abutment against the radial wall 18 in the counterbore in the tube block 12. In the embodiment illustrated, the tube 10 is fixed relative to the tube block 12 by a stationary rear bead die 40 having a bead cavity 42, with the free end portion 32 of tube 10 extending a distance X as seen in FIG. 3, from the front face 12a of the tube block 12 and, the tube block 12 is positioned a distance Y from the rear bead die 40.

Figure 4:
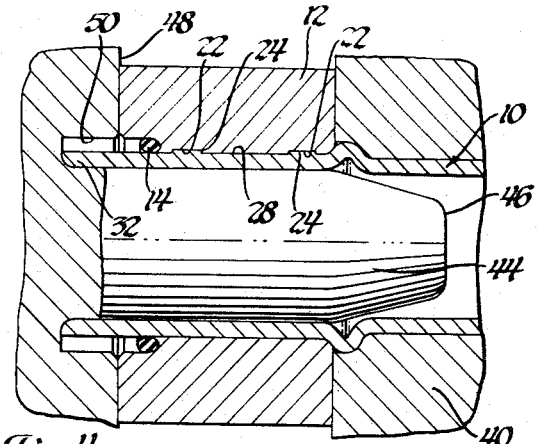

In the next step illustrated in FIG. 4, an expanding mandrel 44, of suitable external diameter, is inserted through the tube 10 inside diameter from its free end forcing tube material to extrude into the axial slots or notches 22 to form the anti-rotation locks 24 on the outer periphery of the tube and at the same time forming the enlarged diameter portion 28 of the tube so that an interference fit exists between this tube portion 28 and the cylindrical wall portion 20 of tube block 12. As shown, the expanding mandrel 44 having a tpaered or bullet head 46 at its free end is fixed at its opposite end to a mandrel block 48 adapted to engage tube block 12 to limit penetration of the expanding mandrel 44 into the tube 10. At the same time, the portion of tube 10 extending from the rear bead die 40 and the tube block 12 are forced to move through distance Y by the mandrel block 48 to form the annular bead 26 in the cavity 42 in the rear bead die. As shown, an annular cavity 50 is provided in the mandrel block 48 adjacent to the base of the expanding mandrel 44 to accept the free end portion 32 of the tube during this process step.

Figure 5:
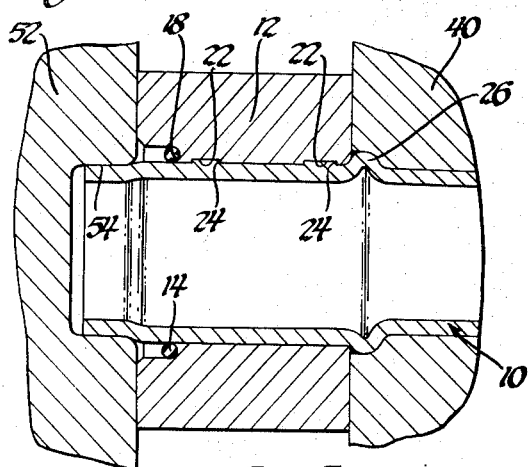

As shown in FIG. 5, a sizing die 52 with an annular die cavity 54 of a desired internal diameter is then used to preswage the outer diameter of the free end portion of tube 10 to the correct diameter for the front bead die 56 used in the final process step.

Figure 6:
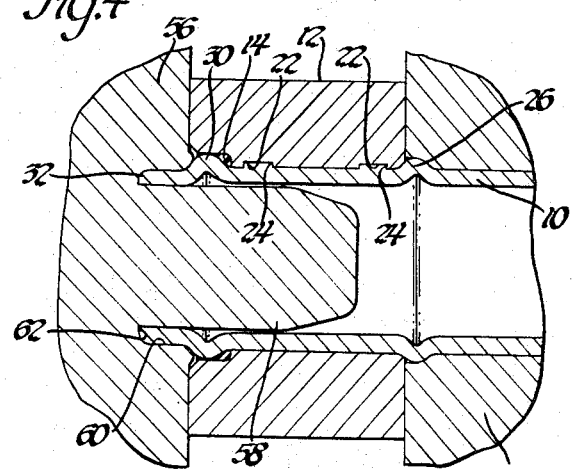

In the final process step shown in FIG. 6, a front bead die 56 is then used to form the annular bead 30 in front of the sealing ring 14 completely trapping it in the tube block 12. Preferably, the front bead die 56 is provided with a support mandrel 58 and an annular cavity 60 of the desired outside diameter and inside diameter, respectively, to properly size the free end portion 32 of tube 10 as desired, the support mandrel 58 also being used to insure that the tube does not collapse inward during the formation of the bead 30. The depth of cavity 60 is such that the free end face of the tube is engaged by the front bead die 56 at the bottom wall 62 of the cavity as the front bead die moves to the right, as seen in FIG. 6, to form the bead 30.

It is apparent from the above description that, depending on the desired finished diameter of the free end portion 32 of the tube, the process step illustrated in FIG. 5 could be eliminated if desired with all sizing of the free end portion of the tube being done in the process step illustrated in FIG. 6. It is also apparent that depending on the intended use of the subject tube to tube block connection, the bead 26 could be eliminated since the anti-rotation locks 24 provide some axial as well as rotational integrity between the tube and tube block.

What is claimed is:

1. A fluid-tight tube joint assembly comprising a tube block having opposed first and second side walls and having at least one circular stepped opening therethrough, said opening being defined by a cylindrical walled counterbored portion extending from said first side wall and terminating in an inward extending radial wall and by a cylindrical wall portion of reduced diameter extending from said second side wall to said radial wall, said cylindrical wall portion of reduced diameter having axial extending splines therein, and a tube extending through said opening with the free end of said tube positioned closely adjacent to and extending from said first side wall, a ring seal encircling said tube and positioned to engage against said inward extending radial wall and said cylindrical walled counterbored portion, said tube having a first external annular bead positioned within said cylindrical walled counterbored portion with a surface of said first bead abutting against said ring seal and with its outer peripheral surface in engagement with said cylindrical walled counterbored portion to form with said inward extending radial wall and said cylindrical walled counterbored portion an enclosed seal ring cavity for said ring seal with said ring seal compressed therein, and a second external annular bead in abutment against said second side wall and, said tube having an intermediate portion between said first and said second annular beads of a diameter such that said intermediate portion is engaged against said cylindrical wall portion of reduced diameter and is engaged in said splines to prevent rotation of said tube relative to said tube block.

2. A fluid-tight tube joint assembly comprising a tube block having opposed first and second side walls and having at least one circular stepped opening therethrough, said opening being defined by a first cylindrical wall portion extending from said first side wall and terminating at an inward extending radial wall and by a second cylindrical wall portion of reduced diameter extending from said second side wall to said radial wall, said second cylindrical wall portion having axial extending splines therein, a tube extending through said opening, said tube having an external annular bead positioned within said first cylindrical wall portion with the outer periphery of said annular bead in engagement with said first cylindrical wall portion, said bead having a radial wall portion forming with a portion of said first cylindrical wall portion and said radial wall an enclosed seal ring cavity, said tube having an enlarged cylindrical portion adjacent said bead and extending to said second side wall in engagement against said second cylindrical wall portion and engaged in said splines and, an O-ring seal encircling said tube and compressed within said seal ring cavity.

3. A fluid-tight tube joint assembly according to claim 2 wherein said tube includes a second external annular bead in abutment against said second side wall of said tube block.

4. In combination, a tube block comprising block means with a first surface portion and a second surface portion on opposite sides thereof, a first bore in said block means extending from said first surface, a partly splined bore of reduced diameter in said block means extending from said second surface and meeting coaxially with said first bore with an intervening shoulder therebetween, a tube extending through said partly splined bore and said first bore, said tube having an external annular bead positioned in said first bore to form therewith and with said intervening shoulder an enclosed seal ring cavity, and an enlarged cylindrical portion adjacent said annular bead and extending in said partly splined bore in an interference fit therewith to said second surface and, an O-ring seal encircling said enlarged cylindrical portion of said tube within said enclosed seal ring cavity.

5. The combination of claim 4 wherein said tube further includes a second external annular bead externally of said block means in abutment against the said second surface portion of said block means.

* * * * *